(12) United States Patent
Schmidt et al.

(10) Patent No.: US 11,235,497 B2
(45) Date of Patent: Feb. 1, 2022

(54) METHOD FOR PRODUCING MOULDED PARTS

(71) Applicant: BIO-TEC BIOLOGISCHE NATURVERPACKUNGEN GMBH & CO. KG, Emmerich (DE)

(72) Inventors: Harald Schmidt, Emmerich (DE); Christoph Hess, Rees (DE); Wolfgang Friedek, Bedburg-Hau (DE)

(73) Assignee: BIO-TEC BIOLOGISCHE NATURVERPACKUNGEN GMBH, & CO. KG, Emmerich (DE)

( * ) Notice: Subject to any disclaimer, the term of this patent is extended or adjusted under 35 U.S.C. 154(b) by 194 days.

(21) Appl. No.: 15/535,677

(22) PCT Filed: Dec. 23, 2015

(86) PCT No.: PCT/EP2015/081118
§ 371 (c)(1),
(2) Date: Jun. 14, 2017

(87) PCT Pub. No.: WO2016/102644
PCT Pub. Date: Jun. 30, 2016

(65) Prior Publication Data
US 2017/0342261 A1    Nov. 30, 2017

(30) Foreign Application Priority Data
Dec. 23, 2014   (DE) .......................... 102014019214.8

(51) Int. Cl.
*B29C 45/00*   (2006.01)
*B29C 51/00*   (2006.01)
(Continued)

(52) U.S. Cl.
CPC .......... *B29C 45/0001* (2013.01); *B29C 48/00* (2019.02); *B29C 49/06* (2013.01);
(Continued)

(58) Field of Classification Search
CPC ......... B29C 49/04; B29C 49/06; B29C 45/00; B29C 48/00; B29C 45/0001; B29C 49/00;
(Continued)

(56) References Cited

U.S. PATENT DOCUMENTS 5,095,054 A * 3/1992 Lay .......................... A01N 25/10
264/328.14
5,691,403 A * 11/1997 Shitaohzono ............. C08L 3/00
524/47
(Continued)

FOREIGN PATENT DOCUMENTS

DE       69431523       6/2003
DE     602004011759    1/2009
(Continued)

OTHER PUBLICATIONS

International Preliminary Report on Patentability cited in PCT/EP2015/081118 dated Jun. 27, 2017.
European Search Report issued in EP20206581 dated Jun. 8, 2021.

*Primary Examiner* — Walter Aughenbaugh
(74) *Attorney, Agent, or Firm* — Workman Nydegger

(57) ABSTRACT

A process is presented and described for the production of moldings, comprising the steps of (a) providing a polymer composition comprising from 1 to 99% by weight of polyhydroxyalkanoate and from 1 to 99% by weight of starch-containing polymer; (b) homogenizing the polymer composition with use of thermal and/or mechanical energy; (c) introducing the polymer composition into a mold; (d) molding the molding in the mold; and (e) removing the molding from the mold. The process described is in particular suitable for the production of hard capsules.

25 Claims, 1 Drawing Sheet

(51) Int. Cl.
*C08L 3/02* (2006.01)
*B29C 48/00* (2019.01)
*B29C 49/06* (2006.01)
*B29C 51/10* (2006.01)
*C08L 67/04* (2006.01)
*B29L 31/00* (2006.01)
*B29K 67/00* (2006.01)

(52) U.S. Cl.
CPC ............ *B29C 51/002* (2013.01); *B29C 51/10* (2013.01); *C08L 3/02* (2013.01); *C08L 67/04* (2013.01); *B29K 2003/00* (2013.01); *B29K 2067/04* (2013.01); *B29L 2031/7174* (2013.01); *C08L 2203/30* (2013.01)

(58) Field of Classification Search
CPC ....... B29C 49/08; B29C 51/00; B29C 51/002; B29C 51/10; B32B 1/02; B32B 1/08; B32B 27/08; B32B 27/18; B32B 27/36
See application file for complete search history.

(56) References Cited

U.S. PATENT DOCUMENTS

| | | | | |
|---|---|---|---|---|
| 7,098,292 | B2* | 8/2006 | Zhao | ........................ A61F 13/26 264/176.1 |
| 9,228,066 | B2* | 1/2016 | Schmidt | .................. C08L 67/00 |
| 10,131,783 | B2* | 11/2018 | Schmidt | .................. C08L 67/02 |
| 2004/0218469 | A1* | 11/2004 | Unterlander | .......... B01F 5/0645 366/336 |
| 2009/0155611 | A1* | 6/2009 | Tedford, Jr. | .............. B32B 1/02 428/481 |
| 2012/0208928 | A1 | 8/2012 | Chen et al. | |
| 2013/0171383 | A1 | 7/2013 | Gohil | |
| 2014/0087106 | A1 | 3/2014 | Law et al. | |
| 2014/0096861 | A1 | 4/2014 | Abhyankar et al. | |
| 2015/0322202 | A1* | 11/2015 | Wang | .................... D01D 5/003 623/1.42 |
| 2016/0060451 | A1 | 3/2016 | Schmidt et al. | |
| 2016/0174469 | A1* | 6/2016 | Shaffer | ................ A01G 9/0291 47/66.7 |

FOREIGN PATENT DOCUMENTS

| | | |
|---|---|---|
| DE | 102007050769 | 4/2009 |
| DE | 102011012869 | 9/2012 |
| DE | 102013017024 | 4/2015 |
| WO | WO9407953 | 4/1994 |
| WO | 9504108 | 2/1995 |
| WO | 2004101683 | 11/2004 |
| WO | WO2007063361 | 6/2007 |
| WO | WO2014166938 | 10/2014 |

\* cited by examiner

METHOD FOR PRODUCING MOULDED PARTS

The invention relates to a process for the production of moldings, and also to moldings produced by this process, in particular hard capsules produced by this process.

Starch is an attractive renewable feedstock for the production of useful materials. However, starch is difficult to process, and production of useful materials containing starch therefore presents a challenge. In particular, production of moldings comprising starch-containing polymers has been found to be difficult.

Various processes have been developed for improving the processability of starch. A method often selected is addition of plasticizers, for example glycerol or sorbitol. Quantities of these plasticizers that usually have to be added in order to obtain the desired effects are about 30% by weight, based on the quantity of starch and plasticizer. This method, with use of pressure and/or heat, can significantly improve the processability of starch. The starch obtained by processing with the plasticizer proportions mentioned has the particular property of being thermoplastically processable. This starch is often also termed thermoplastic starch (TPS). WO 01/37817 A1 describes the use of thermoplastic starch thus produced for the production of soft capsules.

Another method of obtaining thermoplastically processable starch consists in producing a mixture of starch and water. Quantities of water added here are usually about 30% by weight, based on the quantity of starch and water. This method, with use of pressure and/or heat, can significantly improve the processability of starch.

By way of example, U.S. Pat. No. 4,738,724 describes a process for the production of hard capsules made of a starch/water mixture with from 5 to 30% by weight water content.

The methods described permit by way of example processing of starch to give moldings by injection molding. However, the moldings thus obtained frequently exhibit disadvantages. Firstly, it is difficult to obtain dimensionally stable moldings with use of thermoplastic starch. Thermoplastic starch moreover tends to absorb water from the ambient air (hygroscopy). Even if moldings made of thermoplastic starch are dimensionally stable immediately after production thereof, they tend to lose their stability over the course of time, because absorbed water renders them deformable.

Moldings obtained via processing of mixtures of starch with large quantities of water are also frequently unable to meet all of the requirements placed upon them. A particular problem is that the water present in the resultant moldings is normally released into the environment. The moldings thus become brittle over the course of time. Even if these moldings can exhibit good dimensional stability, therefore, embrittlement frequently prevents retention of this over a prolonged period.

Gelatin is another starting material that can be used in injection molding. Injection molding of aqueous gelatin to give two-part hard capsules is described by way of example in DE 34 38 235 C2.

However, moldings produced from gelatin also frequently suffer from the described lack of dimensional stability, in particular over a prolonged period. Another disadvantage of gelatin is the fact that it is obtained from animal waste products and therefore requires treatment in order by way of example to avoid propagation of diseases.

Capsules are often used for administration of medication. In principle there are two types of capsules: hard capsules and soft capsules. Capsules are mostly produced from gelatin. The process most often used for the production of hard capsules from gelatin is the immersion process. This is described by way of example in DE 24 28 397 A1. In this immersion process for the production of two-part capsules, suitably designed pins are immersed into an aqueous gelatin solution and then removed therefrom. Disadvantages of the immersion process are the low production rate resulting from the drying step and restricted design freedom for the capsule parts.

Attempts have also been made to produce hard capsules by injection molding. Examples of hard capsules produced from starch and/or from gelatin can be found in the documents mentioned in the introduction. However, the hard capsules produced by these production processes have the abovementioned disadvantages, in particular lack of dimensional stability over a prolonged period.

Starting from the prior art, it was an object of the invention to provide a process which can produce starch-containing moldings of entirely vegetable origin. The moldings obtained by the process of the invention should in particular be dimensionally stable, in particular over a prolonged period.

The object is achieved in the invention via a process as claimed in claim 1, moldings as claimed in claim 20, and also a hard capsule as claimed in claim 21.

Advantageous embodiments of the invention are described in the dependent claims and are explained in detail below, together with the general concept of the invention.

The process of the invention for the production of a molding comprises
 a. providing a polymer composition comprising from 1 to 99% by weight of polyhydroxyalkanoate and from 1 to 99% by weight of starch-containing polymer;
 b. homogenizing the polymer composition with use of thermal and/or mechanical energy;
 c. introducing the polymer composition into a mold;
 d. molding a molding in the mold;
 e. removing the molding from the mold.

Surprisingly, it has been found that the presence of a polyhydroxyalkanoate in the mixture produces a polymer composition which can give good results when processed by injection molding and/or by a forming process, in particular thermoforming. The products obtainable by this process are moreover dimensionally stable. These products moreover exhibit good dimensional stability over a prolonged period.

In a preferred embodiment, the process of the invention for the production of a molding comprises
 a. providing a polymer composition comprising from 5 to 95% by weight of polyhydroxyalkanoate and from 5 to 95% by weight of starch-containing polymer;
 b. homogenizing the polymer composition with use of thermal and/or mechanical energy;
 c. introducing the polymer composition into a mold;
 d. molding a molding in the mold;
 e. removing the molding from the mold.

Unless otherwise stated, "% by weight" data are based on the total weight of the polymer composition.

In another preferred embodiment of the invention, the polymer composition comprises from 10 to 90% by weight, preferably from 20 to 80% by weight, more preferably from 30 to 70% by weight, of polyhydroxyalkanoate.

In another embodiment of the invention, the polymer composition comprises from 10 to 90% by weight, preferably from 20 to 80% by weight, more preferably from 30 to 70% by weight, of starch-containing polymer.

In another embodiment of the invention, the polymer composition comprises from 70 to 99% by weight of polyhydroxyalkanoate and from 1 to 30% by weight of starch-containing polymer.

In another embodiment of the invention, the polymer composition comprises from 74 to 99% by weight of polyhydroxyalkanoate and from 1 to 26% by weight of starch-containing polymer.

In another embodiment of the invention, the polymer composition comprises from 80 to 99% by weight of polyhydroxyalkanoate and from 1 to 20% by weight of starch-containing polymer.

In another embodiment of the invention, the polymer composition comprises from 85 to 99% by weight of polyhydroxyalkanoate and from 1 to 25% by weight of starch-containing polymer.

In another embodiment of the invention, the polymer composition comprises from 89 to 99% by weight of polyhydroxyalkanoate and from 1 to 11% by weight of starch-containing polymer.

In another embodiment of the invention, the polymer composition comprises from 94 to 99% by weight of polyhydroxyalkanoate and from 1 to 6% by weight of starch-containing polymer.

In another preferred embodiment of the invention, the polymer composition comprises, alongside the constituents polyhydroxyalkanoate and starch-containing polymer, a quantity of at most 10% by weight, in particular at most 5% by weight, preferably at most 4% by weight, more preferably at most 3% by weight, still more preferably at most 2% by weight, most preferably at most 1% by weight, of other constituents.

In a preferred embodiment of the invention, the polymer composition respectively comprises less than 10% by weight, in particular less than 5% by weight, preferably less than 4% by weight, more preferably less than 3% by weight, still more preferably less than 2% by weight, most preferably less than 1% by weight, of one or more of the substances selected from polyisoprene, polyamides, polylactic acid, polycaprolactone, cellulose, cellulose ester, cellulose ether, talc powder, calcium carbonate and fillers. It is preferable that the polymer composition is free from one or more of the substances selected from polyisoprene, polyamides, polylactic acid, polycaprolactone, cellulose, cellulose ester, cellulose ether, talc powder, calcium carbonate and fillers.

The process of the invention has a plurality of steps. The homogenization can be achieved by any measures familiar to the person skilled in the art active in the field of plastics technology. Homogenization of the composition is preferably achieved by dispersion, stirring, kneading and/or extrusion. In a preferred embodiment of the invention, shear forces act on the composition during homogenization. Suitable production processes which can also be applied by analogy to the production of the polymeric material of the invention are described by way of example in the documents EP 0 596 437 B1 and EP 2 203 511 B1. The homogenization of the polymer composition is particularly preferably carried out in an extruder.

In a preferred embodiment of the invention, the polymer composition is heated during homogenization. In particular, the homogenization of the polymer composition can be carried out at a temperature of from 80 to 220° C.

In the process of the invention, the starch present in the starch-containing polymer, or the starch derivative, is advantageously in essence destructured during the homogenization. In particular, any granular starch still present in the starch-containing polymer can be destructured here. The meaning of destructured in this context is that the granular, crystalline structure that is particularly clearly apparent in native starch has been destroyed completely or at least to a very great extent. In the case of functionalized starch, this can already have occurred at least to some extent by virtue of the functionalization. The destructuring can easily be detected by way of example by studying blend cross sections in a scanning electron microscope. Alternatively, the starch phase of the polymer composition can be isolated and studied under a polarizing microscope to determine whether crystalline constituents are present.

It is necessary to distinguish between destructured starch and cases where native starch according to this invention is simply used in unmodified form, e.g. as filler, and the granular structure of the starch is retained at least to some extent.

Destructured starch can advantageously be present in the form of (optionally previously manufactured) plasticized thermoplastic starch (TPS) in the polymer composition of the invention. However, it is preferable that the destructured starch in the polymer composition of the invention is as far as possible free from plasticizer.

The process of the invention can use various starch-containing polymers. The starch-containing polymer is preferably selected from the group consisting of native starch, thermoplastic starch, functionalized starch, starch monophosphate, starch diphosphate, starch sulfate, starch ester, starch ether, hydroxypropylstarch, carboxymethylstarch, starch acetate, and mixtures thereof. In relation to the preferred destructuring of functionalized starches in the process of the invention it should be noted that, to the extent that these are used, they are subjected to at least some extent to destructuring, insofar as they have not yet been destructured. In particular, any granular starch still present in the starch-containing polymer can be destructured.

In a preferred embodiment, a starch-containing polymer blend is used as starch-containing polymer in which starch is present with a thermoplastic polymer in compounded form. It is preferable that the thermoplastic polymer is a polyester, preferably a polyester based on dicarboxylic acids and diols, more preferably a random aromatic-aliphatic copolyester, in particular based on adipic and/or sebacic acid, still more preferably a copolyester based on adipic acid, terephthalic acid and butanediol, most preferably poly (butylene adipate-co-terephthalate) with a glass transition temperature from −25 to −40° C. and/or with a melting range from 100 to 120° C. It is preferable that the starch-containing polymer blend comprises a quantity of from 50 to 85% by weight, more preferably from 60 to 80% by weight, still more preferably from 65 to 75% by weight, of the thermoplastic polymer, in particular the polyester, and/or a quantity of from 15 to 50% by weight, more preferably from 20 to 40% by weight, still more preferably from 25 to 35% by weight, of starch, based in each case on the total weight of the starch-containing polymer blend. This type of starch-containing polymer blend is marketed by way of example by Biotec with trade name Bioplast GF 106/02.

Native starch has preferably been produced from maize, wheat, rice, tapioca and/or potatoes. The native starch advantageously comprises from 0 to 100% by weight of amylose and from 100 to 0% by weight of amylopectin, based on the weight of the starch. It is moreover conceivable that the starch-containing polymer has been treated with a crosslinking agent before use, examples being epichlorohydrin, anhydrides of dicarboxylic acids, di- or trihalogenated hydrocarbons, di- or trihalogenated organic acids, formaldehyde, phosphorus oxychloride, metaphosphate and/or acrolein. It is also conceivable that prior treatment with acids and/or enzymes has been used to convert the starch-containing polymer by way of example into dextrins.

In another embodiment of the process of the invention, the polymer composition comprises less than 10% by weight, preferably less than 6% by weight, more preferably less than 4% by weight, based on the total weight of starch and plasticizer, of a carbon-containing plasticizer with molar mass 500 g/mol or less, in particular 300 g/mol or less, for example glycerol and/or sorbitol. Other examples of carbon-containing plasticizers are arabinose, lycose, xylose, glycose, fructose, mannose, allose, altrose, galactose, gulose, idose, inositol, sorbose, talitol and monoethoxylate, monopropoxylate and monoacetate derivatives thereof, and also ethylene, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-, 1,3-, 1,4-butanediol, 1,5-pentanediol, 1,6-, 1,5-hexanediol, 1,2,6-, 1,3,5-hexanetriol, neopentyl glycol, trimethylolpropane, pentaerythritol, sorbitol and their acetate, ethoxylate and propoxylate derivatives.

Destructured starch can also be obtained without addition of carbon-containing plasticizers by homogenizing native starch preferably together with at least one polyhydroxyalkanoate and with sufficiently high water content with exposure to high shear forces and temperatures. The water is preferably in turn removed by drying during, or at the end of, the homogenization.

The water content of the polymer composition is advantageously adjusted before introduction of the polymer composition into the mold in the process of the invention to less than 10% by weight, preferably less than 7% by weight, more preferably less than 5% by weight, based on the total weight of the polymer composition.

Water contents stated here can in particular refer to the material obtained after homogenization and before introduction into the mold. Water content can be determined by collecting a sample of the homogenized material in a sealable vessel and sealing said vessel so that it is airtight. Care has to be taken here to maximize the extent to which the vessel is filled with the homogenized material, in order to minimize air inclusion in the vessel. After the sealed vessel has been cooled, this can be opened, a sample can be taken, and water content can be determined by way of example by means of Karl Fischer titration.

It is preferable to adjust the water content by drying during homogenization. The drying can be achieved by way of example by devolatilizing the mixture, advantageously by removing water vapor by suction during homogenization.

The polymer composition in the process of the invention comprises a polyhydroxyalkanoate.

For the purposes of the invention, polyhydroxyalkanoates can in particular be polyhydroxy fatty acids which comprise monomers with a chain length of at least 4 carbon atoms.

It is preferable that the polyhydroxyalkanoate of the polymer composition comprises repeating monomer units of the formula (1)

[—O—CHR—CH$_2$—C(O)—] (1), where R is an alkyl group of the formula $C_nH_{2n+1}$ and n is an integer from 1 to 15, in particular from 1 to 6.

Practical experiments have shown that it is advantageous that in the process of the invention the polyhydroxyalkanoate of the polymer composition is selected from the group consisting of poly(3-hydroxybutanoate), poly(3-hydroxyvalerate), poly(3-hydroxyhexanoate), poly(3-hydroxybutyrate-co-3-hydroxyvalerate), poly(3-hydroxybutyrate-co-3-hydroxyhexanoate) and mixtures thereof.

Particularly good results are obtained when the polyhydroxyalkanoate is selected from poly-3-hydroxybutyrate (PHB)

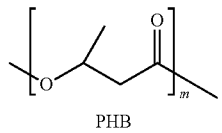

PHB and poly(3-hydroxybutyrate-co-3-hydroxyhexanoate) (PHBH)

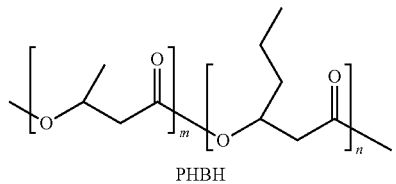

PHBH and mixtures thereof.

Ideal results are obtained when the ratio m:n in structural formulae above is from 95:5 to 85:15, particularly preferably from 90:10 to 88:12. The polyhydroxyalkanoate of the polymer composition in the process of the invention is preferably a copolymer. In a particularly preferred embodiment, the polyhydroxyalkanoate comprises PHBH or consists thereof. Practical experiments have shown that a PHBH with a molar proportion of from 5 to 15 mol %, particularly preferably from 7 to 13 mol % or from 10 to 13 mol %, of 3-hydroxyhexanoate, based in each case on the total quantity of PHBH, delivers very good results.

In a preferred embodiment of the invention, polyhydroxyalkanoate used comprises a PHBH with a molar proportion of from 1 to 15 mol %, particularly preferably from 2 to 10 mol % or from 4 to 8 mol %, of 3-hydroxyhexanoate.

In a preferred embodiment, the polyhydroxyalkanoate is biobased and/or produced by biotechnology.

A particularly preferred polyhydroxyalkanoate is marketed by Kaneka with trade name Aonilex®.

The weight-average molar mass of the polyhydroxyalkanoate used in the process of the invention in the polymer composition can in particular be from 60 000 to 500 000 g/mol, preferably from 120 000 to 300 000 g/mol.

The person skilled in the art is aware of methods for determining the molar mass, in particular the weight-average molar mass. The weight-average molar mass of polyhydroxyalkanoates can by way of example be determined by gel permeation chromatography (GPC). In particular, the molar mass of polyhydroxyalkanoates can be determined by GPC against polystyrene standards by using a mixed-bed column with chloroform as eluent. A mixed-bed column particularly suitable for these purposes is one comprising a material made of styrene-divinylbenzene.

Gel permeation chromatography is one of the methods of liquid chromatography. GPC can separate molecules of dissolved substances on the basis of their size. The usual experimental method involves injecting the sample, which is soluble in the eluent, into the GPC. In an ideal situation, not only is the sample soluble in the eluent, but the behavior of the sample molecules dissolved in the eluent is similar to that of the molecules of the standard used. The GPC column usually comprises, as what is known as stationary phase, a porous polymer which by virtue of crosslinking does not dissolve in the eluent. The porosity of the stationary phase, and also its pore size distribution, differ from column to column. Mixed-bed columns usually have a broad pore size distribution, and can therefore separate samples over a wide molar mass range, for example from 500 to 1 000 000 g/mol. Smaller molecules can also penetrate into the smaller pores of the stationary phase. The diffusion volume available to these during passage through the stationary phase is therefore larger than that available for larger molecules. Smaller molecules therefore require more time than larger molecules to complete their passage through the stationary phase of the column. The smaller molecules are also said to have a longer retention time.

The test sample molecules which have passed through the stationary phase can be observed by way of example by using a refractive index detector (RI detector), or optionally a UV detector. Determination of weight-average molar mass on the basis of the refractive index measured usually requires a calibration procedure. The calibration procedure can in particular be carried out with the aid of standards. The standards are polymers, for example polystyrene, with known molar mass. It is also possible to use light-scattering detectors for detection, in particular in combination with an RI detector. The weight-average molar mass can then be determined without any calibration procedure.

Alternatively, mass spectrometry, in particular matrix-assisted laser-desorption/ionization mass spectrometry (MALDI-MS) can be used to determine the weight-average molar mass. In MALDI-MS, the test sample is cocrystallized with a matrix on a substrate. A laser can then be used to desorb the sample together with the matrix from the substrate. The sample usually also becomes ionized here. The person skilled in the art is aware of suitable matrices. The matrix used can in particular be sinapinic acid, 2,5-dihydroxybenzoic acid and/or alpha-cyanohydroxycinnamic acid. After ionization, the weight of the sample can usually be determined in the mass spectrometer by measuring the flight time of the ionized sample or by measuring the deflection of the ionized sample in an electrical field and/or in a magnetic field. The weight can in particular be derived from the ratio of mass to charge.

The melting point of the polyhydroxyalkanoate used in the process of the invention in the polymer composition can in particular also be from 120 to 200° C., preferably from 150 to 180° C.

The person skilled in the art is aware of methods for melting point determination. By way of example, melting point can be determined by differential scanning calorimetry (DSC). When a polymer sample is subjected to a defined heating/cooling program, phase transitions attended by transformation of energy (glass transition, crystallization, melting, etc.) are recorded in the form of exothermic (e.g. crystallization) or endothermic (e.g. melting) peaks in DSC plots. A precondition for the appearance of a peak in DSC is therefore that the phase transition takes place during the procedure, i.e. while the sample is subject to the temperature program. An amorphous sample which crystallizes during the heating procedure therefore produces an exothermic peak in the heating phase. The number of exothermic and endothermic peaks appearing is dependent on the number and nature of the phase transitions taking place while the sample is subject to the temperature program; the glass transition temperature is discernible here as a discontinuity rather than as a peak.

The procedure often uses a temperature program consisting of a heating-cooling-heating cycle. When this temperature program is used, the sample is first equilibrated to a preset starting temperature for from 2 to 5 minutes. After this first equilibration phase, the sample is heated at a uniform heating rate up to a preset first target temperature. A heating rate of 10° C./min is often used. At the first target temperature, the sample can again be equilibrated for from 2 to 5 minutes, and then can be cooled at a constant cooling rate down to a preset second target temperature. A cooling rate of 10° C./min is usually used. At the second target temperature, the sample can again be equilibrated for from 2 to 5 minutes and then can be heated at a uniform heating rate up to a preset third target temperature at which the sample is kept for from 2 to 5 minutes before the procedure is terminated. The heating rate used is usually the same as in the first heating phase, e.g. 10° C./min. The first and third target temperature can be the same or different, and the starting temperature and the second target temperature can likewise be the same or different.

The polymer composition in the process of the invention can also comprise other constituents, in particular nucleating agents, extenders, lubricants, crosslinking agents, and/or colorants. It is of no importance here whether these other constituents are added to the actual polymer composition provided or to the starch or to the polyhydroxyalkanoate.

In an embodiment of the process of the invention, the polymer composition comprises nucleating agents, for example boron nitride (BN), talc ($Mg_3[Si_4O_{10}(OH)_2]$) particles and lime ($CaCO_3$) particles, cyclodextrins, polyvinyl alcohol particles, terbium oxide, saccharin, thymine, uracil, orotic acid and/or cyanuric acid. The polymer composition can comprise by way of example a quantity of from 0 to 10% by weight, preferably from 0.5 to 5% by weight, of these nucleating agents. However, in a preferred embodiment of the process of the invention, the polymer composition comprises less than 10% by weight, preferably less than 5% by weight, more preferably less than 3% by weight, still more preferably less than 1% by weight, of nucleating agents. It is most preferable that the polymer composition in the process of the invention comprises at most traces of nucleating agents.

In another embodiment of the process of the invention, the polymer composition comprises up to 90% by weight, preferably no more than 30% by weight, based on the total weight of the polymer composition, of an extender. Extenders used in particular comprise extenders selected from the group consisting of chalk, lime, talc, calcium carbonate, aluminum oxide, magnesium oxide, silicates, kaolin, dolomite, sunflower proteins, soybean proteins, cottonseed proteins, peanut proteins, rapeseed proteins, lactose, gum arabic, acrylates, methacrylates, polycaprolactone, cellulose, water-soluble cellulose derivatives, for example cellulose acetyl phthalate, hydroxypropylcellulose, hydroxypropylmethylcellulose, hydroxymethylcellulose phthalate, hydroxymethylcellulose, polyvinyl alcohol, polyvinylpyrrolidone, shellack, bentonite, polyvinyl acetyl phthalate, phthalic-acid- or succinic-acid-treated gelatins, polysaccharides, for example agar-agar and mixtures thereof.

In another embodiment of the process of the invention, the polymer composition comprises from 0.001 to 10% by weight, preferably from 0.01 to 2% by weight, based on the total weight of the polymer composition, of a lubricant. Lubricants used can in particular be lubricants selected from the group consisting of lipids, in particular glycerides (oils and fats), glycerol monostearate, sorbitan fatty acid esters, for example sorbitan monostearate, sorbitan monolaurate, sorbitan monooleate, sorbitan monopalmitate, amides, in particular fatty acid amides, for example stearamide, behenamide, erucamide, oleamide, waxes, phospholipids, for example unsaturated or saturated vegetable fatty acids and their salts, for example aluminum stearate, calcium stearate, magnesium stearate, tin stearate, talc powder, silicones and mixtures thereof.

Crosslinking agents that can be used are in particular the crosslinking agents listed as possible crosslinking agents for starch.

In another embodiment of the process of the invention, the polymer composition comprises from 0.001 to 10% by weight, based on the total weight of the polymer composition, of one or more colorants. Colorants that can be used are in particular colorants selected from the group consisting of azo colorants, pigments such as iron oxides, titanium dioxides, natural colorants and/or mixtures thereof.

In a particularly preferred embodiment, all of the constituents of the moldings and/or of the polymer composition are pharmacologically acceptable and/or pose no risk to health. In particular, all of the constituents of the moldings and/or of the polymer composition can be edible and/or safe for human consumption.

The process of the invention can be carried out in a single stage, and the polymer composition can be directly introduced into a mold after homogenization. Alternatively, the process can also be carried out in two stages. It is possible here to begin by providing a polymer composition comprising from 1 to 99% by weight, preferably from 5 to 95% by weight, of starch and from 1 to 99% by weight, preferably from 5 to 95% by weight, of polyhydroxyalkanoate; this can be homogenized with use of thermal and/or mechanical energy and isolated as intermediate by way of example in the form of pellets. In particular, the homogenization can be defined by further features as described herein. The polymer composition can in particular be defined by one or more further features as described herein. These isolated pellets can then be heated in a second stage and introduced into a mold; a molding can be molded and removed from the mold.

In an example of an embodiment of the two-stage process, the homogenized polymer composition comprising from 1 to 99% by weight, preferably from 5 to 95% by weight, of starch and from 1 to 99% by weight, preferably from 5 to 95% by weight, of polyhydroxyalkanoate is first processed to give a sheet or a film, for example a flat film. These films or sheets can be produced by way of example by extrusion, for example through a slot die. The films or sheets can be produced directly with the compounded mixture, or the isolated pellets comprising from 1 to 99% by weight, preferably from 5 to 95% by weight, of starch and from 1 to 99% by weight, preferably from 5 to 95% by weight, of polyhydroxyalkanoate can, before introduction into the mold in step c. of the process of the invention, be further processed to give the films or sheets as intermediate. These sheets or films can then be introduced into a mold in a second stage; a molding can be molded and removed from the mold. The thicknesses of the sheets or films produced as intermediates can differ. The thickness of sheets can by way of example be from 1 to 20 mm, in particular from 1 to 18 mm or from 2 to 15 mm. The thickness of films, in particular flat films, can by way of example be from 0.1 to 1.5 mm, in particular from 0.2 to 1.3 mm.

In one embodiment of the process of the invention, the polymer composition, in particular in the form of sheets or films, is reformed in the steps c. and d. by a forming process, preferably by thermoforming, in particular by flexural forming, vacuum forming, stretch forming and/or pressure forming. The term thermoforming in particular also covers these processes. The person skilled in the art is aware of suitable procedures for the forming process. This permits particularly cost-effective conduct of the process of the invention. It is moreover possible here that the sheet or film is also coated with one or more other materials before introduction into the molding in step c. It is thus possible to produce a multilayer film or a multilayer sheet. Coating with one or more other materials can also be achieved simultaneously with the production of the sheet or film, for example by coextrusion. It is thus also possible to achieve precise adjustment of the properties of the molding.

The sheet or film can in particular be heated for the forming process. The sheet or film can be heated by heat from above and/or from below. The heating can be achieved by using radiant heaters, for example by using high-temperature ceramic sources. The sheet or film can thus be exposed to temperatures of from 200 to 800° C., in particular from 300 to 700° C. or from 400 to 600° C. The heating time can by way of example be from 5 to 25 seconds, in particular from 8 to 20 seconds.

The forming process carried out on the sheet or film, in particular after heating, can be achieved by use of flexure, vacuum, stretching and/or pressure. The vacuum can be achieved by application of a negative gauge pressure relative to a reference pressure in the mold. The reference pressure used for the negative gauge pressure can be the ambient pressure or another pressure; the reference pressure used is preferably 1 bar. By way of example, a gauge pressure of from −0.1 to −0.99 bar, in particular from −0.3 to −0.95 bar, respectively relative to a reference pressure, preferably of 1 bar, can be applied for the process of forming by vacuum.

The pressure can be achieved by applying a positive gauge pressure relative to a reference pressure in the mold. Reference pressure used for the negative gauge pressure can be the ambient pressure or another pressure; it is preferable to use a reference pressure of 1 bar. By way of example, a gauge pressure of from 0.1 to 2 bar, in particular from 0.3 to 1 bar, respectively relative to a reference pressure, preferably of 1 bar, can be applied for the process of forming by pressure.

The mold used for the forming process can have one or more cavities.

Accordingly, in a preferred embodiment of the invention the moldings are molded in the steps c. and d. by a forming process, in particular by thermoforming.

In a particularly preferred embodiment of the process of the invention, the polymer composition comprises, as polyhydroxyalkanoate, from 74 to 99% by weight, in particular from 89 to 99% by weight, of PHBH (poly(3-hydroxybutyrate-co-3-hydroxyhexanoate)) with a molar proportion of from 5 to 15 mol % of 3-hydroxyhexanoate, and from 1 to 26% by weight, in particular from 1 to 11% by weight, of starch-containing polymer, and less than 5% by weight, preferably less than 4% by weight, more preferably less than 3% by weight, still more preferably less than 2% by weight, most preferably less than 1% by weight, of one or more of the substances selected from polyisoprene, polyamides, polylactic acid, polycaprolactone, cellulose, cellulose ester, cellulose ether, talc powder, calcium carbonate and fillers, where the moldings are molded in the steps c. and d. by a forming process, in particular by thermoforming.

In an embodiment of the process of the invention, the polymer composition is molded by injection molding in the steps c. and d. This permits very cost-effective conduct of the process. The person skilled in the art is aware of suitable procedures for injection molding. By way of example, suitable procedures for injection molding of starch-containing polymer compositions which can also be used analogously in the process of the invention are described in EP 0 118 240 A2, U.S. Pat. No. 4,738,724 and DE 34 38 235 C2.

In a preferred embodiment of the process of the invention, the pressure with which the polymer composition is injected into the molding in step c. is more than 1 bar, preferably more than 100 bar. It is more preferable that the pressure with which the polymer composition is injected into the molding is from 150 to 3000 bar.

The pressure to be used in step c. can depend on a plurality of factors. In particular, the pressure can depend on the number of cavities into which material is injected. A larger number of cavities usually requires a higher pressure. The pressure can moreover depend on the injection pathways, in particular on the length and/or geometry of the injection pathways. Longer injection pathways usually require a higher pressure. The pressure can moreover also depend on the viscosity of the polymer composition. Higher viscosity usually requires a higher pressure.

In another embodiment of the process of the invention, the temperature of the polymer composition when said composition is injected into the mold in step c. is above 23° C., preferably above 50° C. It is more preferable that the temperature of the polymer composition when said composition is injected into the mold in step c. is from 80 to 200° C.

In particular, the temperature of the mold into which the polymer composition is introduced can be from 10 to 100° C., preferably from 20 to 90° C.

In another embodiment of the process, the molding obtainable by way of example by a forming process or by injection molding is coated in a further step after removal from the mold. By way of example, coating can be used to provide the molding with a barrier to gases, in particular to oxygen. Coating compositions that can be used here are organic materials, for example highly amorphous polyvinyl alcohol, as well as inorganic materials, for example metals, in particular aluminum, or materials comprising silicon oxide. The thickness of the coating is advantageously from 0.1 to 100 µm, in particular from 1 to 50 µm.

The invention further provides moldings produced by a process of the invention.

In particular, the process of the invention is suitable for the production of hard capsules, preferably of hard capsules for pharmaceutical purposes.

The invention further provides hard capsules comprising a dimensionally stable capsule body and a dimensionally stable capsule cap with respectively at least one side wall and one closed end, where the capsule body and/or the capsule cap has/have been produced by a process of the invention. In particular, the hard capsules of the invention have two parts.

In another embodiment, the hard capsule has a smooth surface. This can facilitate swallowing of the capsule.

In a preferred embodiment of the invention, capsule body and capsule cap can be coaxially inserted into one another. This permits simple closure of the capsule.

In another embodiment of the invention, capsule body and capsule cap have, in the respective at least one side wall in the vicinity of their open end, a closure device which fits together and produces a connection which cannot be separated after the capsule parts have been pushed together. It is thus possible to ensure that the capsule cannot be reopened after filling and closure.

Various closure devices can be used. In particular, the capsule cap can have a groove, and the capsule body can have an elevation that is appropriate therefor, and that can engage with the groove of the capsule cap. The person skilled in the art is aware of other embodiments, which in particular are described in DE 34 38 235 C2 and U.S. Pat. No. 4,738,724.

In another embodiment of the invention, the capsule body comprises more than one compartment.

In particular it is possible, by suitable adaptation of the polymer composition, to influence the dissolution behavior and/or retard behavior of the hard capsules of the invention. Use of a suitable combination of the constituents can thus provide hard capsules that by way of example are resistant to gastric fluid for up to two hours but can dissolve within 30 minutes in the fluid of the small intestine.

The process of the invention is moreover suitable for the production of moldings which have particularly good suitability as containers or capsules for coffee in the appropriate coffee machines. This particularly preferred embodiment of the moldings of the invention is described in more detail below with reference to the following drawings.

Figure 1:
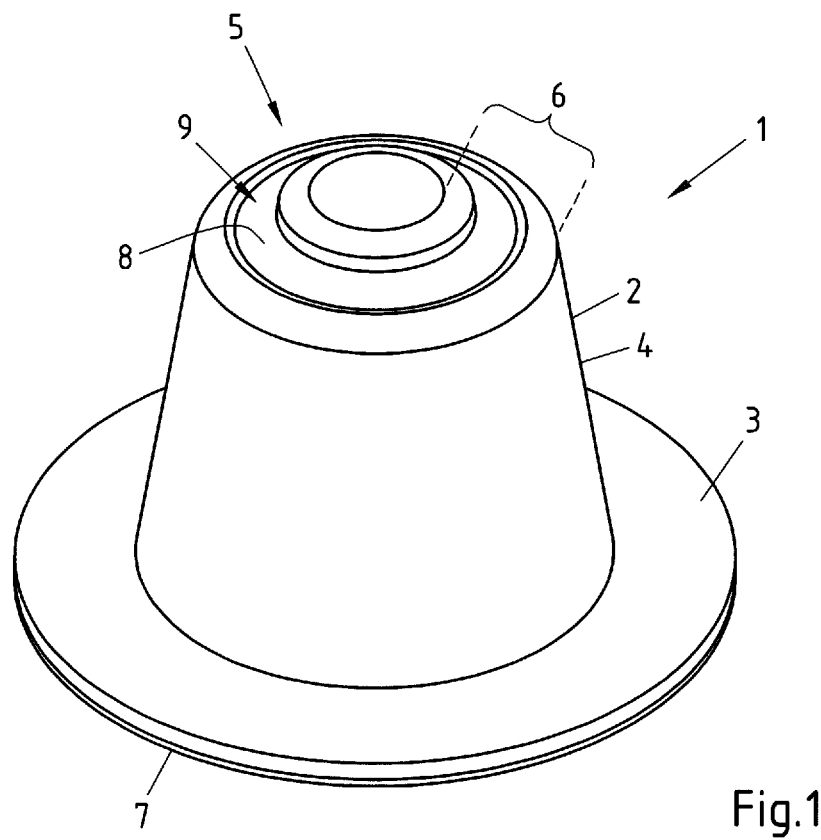
FIG. 1 is a schematic diagram of a particularly preferred embodiment of the moldings of the invention in plan view.

FIG. 1 is a plan view of a particularly preferred embodiment 1 of the moldings of the invention, comprising a frustoconical body 2 with a rim 3, a side wall 4, and an inlet wall 5, where the inlet wall 5 can comprise a flat or convex portion 6, and with an adjunct wall 7 which is situated at a lower position and which seals the rim 3, where the flat or convex portion 6 has a recessed or profiled structure 8, where this recessed or profiled structure 8 facilitates puncture of this structure by blades which belong to the injection device and follows a substantially circular course 9, the diameter of which is defined by the diameter of the blades, the arrangement of which is likewise circular, where in particular the frustoconical body 2 of the molding is obtainable by the process of the invention.

Figure 2:
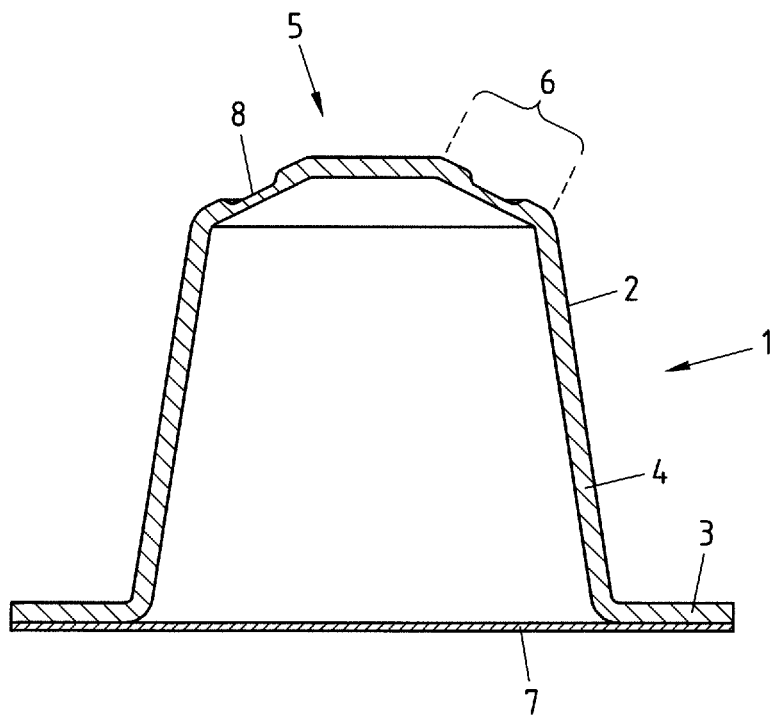
FIG. 2 is a schematic diagram of a particularly preferred embodiment of the moldings of the invention in cross-sectional view.

FIG. 2 is a cross section of a particularly preferred embodiment 1 of the moldings of the invention, comprising a frustoconical body 2 with a rim 3, a side wall 4, and an inlet wall 5, where the inlet wall 5 can comprise a flat or convex portion 6, and with an adjunct wall 7 which is situated at a lower position and which seals the rim 3, where the flat or convex portion 6 has a recessed or profiled structure 8, where this recessed or profiled structure 8 facilitates puncture of this structure by blades which belong to the injection device and follows a substantially circular course, the diameter of which is defined by the diameter of the blades, the arrangement of which is likewise circular, where in particular the frustoconical body 2 of the molding is obtainable by the process of the invention.

The adjunct wall 7 situated at a lower position advantageously seals the rim 3 of the capsule in a manner that is in essence gastight. It is moreover in particular possible that the frustoconical body 2 and/or the adjunct wall 7 of the embodiment 1 has/have been coated, advantageously with a gastight coating, for example by metallization, as described above. Gastight packaging prolongs the shelf life of oxidizable substances present in the capsule.

In a particularly preferred embodiment of the moldings of the invention, both the frustoconical body 2 and the adjunct wall 7 situated at a lower position are biodegradable in accordance with EN 13432, preferably completely biodegradable, so that the entirety of this embodiment of the moldings of the invention is biodegradable.

The principle of the invention will be explained in more detail below by reference to examples.

The following materials were used for the embodiment: poly(hydroxybutyrate-co-hexanoate), PHBH (AONILEX X 151 A, KANEKA); native potato starch (EMS-LANDSTÄRKE); starch-containing polymer blend, GF106 (BIOPLAST GF106/02, BIOTEC); thermoplastic starch, TPS (BIOPLAST TPS, BIOTEC)

EXAMPLE 1 (TWO-STAGE PROCESS)

A Werner & Pfleiderer (COPERION) ZSK 40 (corotating) twin-screw extruder, screw diameter 40 mm, L/D=42, was used to compound the following formulation A (metered proportions in percent by mass):

TABLE 1

| Formulation |      |
| ----------- | ---- |
|             | A    |
| PHBH        | 69.8 |
| Starch      | 30.2 |

The compounding parameters maintained here were as follows:

TABLE 2

| ZSK 40 temperature profile | | | | | | | | |
| --- | --- | --- | --- | --- | --- | --- | --- | --- |
| Zone 1 | Zone 2 | Zone 3 | Zone 4 | Zone 5 | Zone 6 | Zone 7 | Zone 8 | Die |
| 25° C. | 170° C. | 170° C. | 160° C. | 160° C. | 160° C. | 160° C. | 160° C. | 150° C. |

Melt temperature on discharge from die: 155° C.

Rotation rate: 140 min$^{-1}$

Throughput: 40 kg/h

Devolatilization: active (vacuum, zone 7)

Water content: smaller than 1% by weight (measured after discharge from the extruder)

The polymer composition was initially isolated in the form of pellets.

The pellets were then processed to give two-part hard capsules in an ARBURG ALLROUNDER 270 M type injection-molding system.

The processing parameters set here were as follows:

TABLE 3

| Processing parameters for injection molding | | | |
| --- | --- | --- | --- |
| Zone 1 | Zone 2 | Zone 3 | Zone 4 |
| 25° C. | 160° C. | 160° C. | 160° C. |

Mold temperature: 45° C.
Cycle time: 30 s
Pressure: 300 bar

The resultant two-part hard capsules featured a smooth surface and excellent dimensional stability. In particular, it was easy to achieve sealing of the resultant hard capsules.

EXAMPLE 2 (TWO-STAGE PROCESS)

A Werner & Pfleiderer (COPERION) ZSK 40 (corotating) twin-screw extruder, screw diameter 40 mm, L/D=42, was used to compound the following formulations B to I (metered proportions in percent by mass):

TABLE 4

| | Formulations | | | | | | | |
| --- | --- | --- | --- | --- | --- | --- | --- | --- |
| | B | C | D | E | F | G | H | I |
| PHBH | 98.5 | 94.5 | 89.5 | 74.5 | 98.5 | 94.5 | 89.5 | 74.5 |
| GF106 | 1.5 | 5.5 | 10.5 | 25.5 | — | — | — | — |
| TPS | — | — | — | — | 1.5 | 5.5 | 10.5 | 25.5 |

The compounding parameters maintained here were as follows:

TABLE 5

| ZSK 40 temperature profile | | | | | | | | | |
| --- | --- | --- | --- | --- | --- | --- | --- | --- | --- |
| Formulation | Zone 1 | Zone 2 | Zone 3 | Zone 4 | Zone 5 | Zone 6 | Zone 7 | Zone 8 | Die |
| B, F | 25° C. | 170° C. | 170° C. | 170° C. | 170° C. | 170° C. | 165° C. | 165° C. | 155° C. |
| C, G | 25° C. | 170° C. | 170° C. | 170° C. | 165° C. | 165° C. | 165° C. | 160° C. | 150° C. |
| D, H | 25° C. | 170° C. | 170° C. | 165° C. | 165° C. | 165° C. | 160° C. | 160° C. | 150° C. |
| E, I | 25° C. | 170° C. | 170° C. | 165° C. | 160° C. | 160° C. | 160° C. | 160° C. | 150° C. |

Melt temperature on discharge from die: from 153° C. to 158° C.

Rotation rate: 140 min$^{-1}$

Throughput: 40 kg/h

Devolatilization: active (vacuum, zone 7)

Water content: smaller than 1% by weight
(measured after discharge from the extruder)

Polymer compositions B to I were initially isolated in the form of pellets.

The pellets B to I were then melted in a COLLIN 30 (DR. COLLIN) single-screw extruder, screw diameter 30 mm, L/D=33, and further processed by means of a MABAG slot die with slot width 30 cm to give flat films with thickness respectively 0.75 mm.

The processing parameters set here for the pellets B to I were as follows:

TABLE 6

| COLLIN 30 temperature profile | | | | |
|---|---|---|---|---|
| Zone 1 | Zone 2 | Zone 3 | Zone 4 | Die |
| 165° C. | 170° C. | 170° C. | 170° C. | 165° C. |

Rotation rate: 53 min$^{-1}$
Slot die gap: 30 cm
Melt temperature on discharge from die: 157° C.
Film thickness: 750 μm The flat films were then subjected to forming on an ILLIG KFG37 sheet thermoforming line to give coffee capsules. For this, the flat films were cut into relatively small pieces, and these were respectively exposed for 15 seconds to radiant heaters providing heat from above reaching a temperature of 500° C., and were then subjected to forming in the mold at a gauge pressure of −0.8 bar, relative to a reference pressure of 1 bar, thus forming the coffee capsules.

What is claimed is:

1. A process for the production of a molding, comprising:
   a. providing a polymer composition comprising from 1 to 99% by weight of polyhydroxyalkanoate and from 1 to 99% by weight of starch-containing polymer and such that the polyhydroxyalkanoate and the starch-containing polymer together constitute at least 90% by weight of the polymer composition;
   b. homogenizing the polymer composition with use of thermal and/or mechanical energy and adjusting the water content of the polymer composition to less than 5% by weight of the polymer composition, wherein starch or functionalized starch present in the starch-containing polymer is destructured during the homogenization;
   c. introducing the homogenized polymer composition into a mold;
   d. molding the homogenized polymer composition in the mold to form a molding that consists essentially of the homogenized polymer composition; and
   e. removing the molding from the mold.

2. The process as claimed in claim 1, wherein the polymer composition comprises from 5 to 95% by weight, or from 10 to 90% by weight, or from 20 to 80% by weight, or from 30 to 70% by weight, of the polyhydroxyalkanoate.

3. The process as claimed in claim 1, wherein the polymer composition comprises from 5 to 95% by weight, or from 10 to 90% by weight, or from 20 to 80% by weight, or from 30 to 70% by weight, of the starch-containing polymer.

4. The process as claimed in claim 1, wherein the homogenization of the polymer composition is carried out at a temperature of from 80 to 220° C.

5. The process as claimed in claim 1, wherein the homogenization of the polymer composition is carried out in an extruder.

6. The process as claimed in claim 1, wherein the starch-containing polymer is selected from the group consisting of native starch, thermoplastic starch, functionalized starch, starch monophosphate, starch diphosphate, starch sulfate, starch ester, starch ether, hydroxypropylstarch, carboxymethylstarch, starch acetate, and mixtures thereof.

7. The process as claimed in claim 1, wherein the polymer composition comprises less than 10% by weight, or less than 6% by weight, or less than 4% by weight, based on the total weight of starch and plasticizer, of a carbon-containing plasticizer with molar mass 500 g/mol or less, or 300 g/mol or less.

8. The process as claimed in claim 1, wherein, before the introduction of the homogenized polymer composition into the mold, the water content of the polymer composition is adjusted to less than 1% by weight, based on the total weight of the polymer composition.

9. The process as claimed in claim 1, wherein the polyhydroxyalkanoate of the polymer composition comprises repeating monomer units of the formula (1)

$$[-O-CHR-CH_2-C(O)-] \qquad (1),$$

where R is an alkyl group of the formula $C_nH_{2n+1}$ and n is an integer from 1 to 15, or from 1 to 6.

10. The process as claimed in claim 1, wherein the polyhydroxyalkanoate of the polymer composition is selected from the group consisting of poly(3-hydroxybutanoate), poly(3-hydroxyvalerate), poly(3-hydroxyhexanoate), poly(3-hydroxybutyrate-co-3-hydroxyvalerate), poly(3-hydroxybutyrate-co-3-hydroxyhexanoate) and mixtures thereof.

11. The process as claimed in claim 1, wherein the polyhydroxyalkanoate of the polymer composition is a copolymer.

12. The process as claimed in claim 1, wherein the weight-average molar mass of the polyhydroxyalkanoate of the polymer composition is from 60,000 to 500,000 g/mol, or from 120,000 to 300,000 g/mol.

13. The process as claimed in claim 1, wherein the melting point of the polyhydroxyalkanoate of the polymer composition is from 120 to 200° C., or from 150 to 180° C.

14. The process as claimed in claim 1, wherein introducing the homogenized polymer composition into the mold and molding the homogenized polymer composition comprise injection molding.

15. The process as claimed in claim 14, wherein the pressure with which the polymer composition is injected into the mold is more than 1 bar, or more than 100 bar.

16. The process as claimed in claim 14, wherein the pressure with which the polymer composition is injected into the mold is from 150 to 3000 bar.

17. The process as claimed in claim 14, wherein the temperature of the polymer composition when said composition is injected into the mold is above 23° C., or above 50° C.

18. The process as claimed in claim 14, wherein the temperature of the polymer composition when said composition is injected into the mold is from 80 to 200° C.

19. The process as claimed in claim 1, wherein the polymer composition is formed into a hard capsule comprising a dimensionally stable capsule body and a dimensionally stable capsule cap with respectively at least one side wall and one closed end.

20. The process as claimed in claim 19, wherein the capsule body and the capsule cap are manufactured so as to be coaxially inserted into one another.

21. The process as claimed in claim 19 wherein, the capsule body and the capsule cap have, in the respective at least one side wall in the vicinity of their open end, a closure device which fits together and/or produces a connection which cannot be separated after the capsule parts have been pushed together.

22. The process as claimed in claim 19, wherein the capsule body comprises more than one compartment.

23. The process as claimed in claim 1, the molding comprising a frustoconical body with a rim, a side wall and an inlet wall, where the inlet wall comprises a flat or convex portion, where the flat or convex portion has a recessed or profiled structure.

24. A process for the production of a molding, comprising:
   a. providing a polymer composition comprising from 1 to 99% by weight of polyhydroxyalkanoate and from 1 to 99% by weight of starch-containing polymer and such that the polyhydroxyalkanoate and the starch-containing polymer together constitute at least 90% by weight of the polymer composition;
   b. homogenizing the polymer composition with use of thermal and/or mechanical energy and adjusting the water content of the polymer composition to less than 5% by weight of the polymer composition, wherein starch or functionalized starch present in the starch-containing polymer is destructured during the homogenization;
   c. forming the homogenized polymer composition from step b. into a sheet or film consisting essentially of the polymer composition;
   d. thermoforming the sheet or film consisting essentially of the polymer composition in a mold to form a molding; and
   e. removing the molding from the mold.

25. A process for the production of a molding, comprising:
   a. providing a polymer composition comprising from 1 to 99% by weight of polyhydroxyalkanoate and from 1 to 99% by weight of starch-containing polymer, wherein the polyhydroxyalkanoate and the starch-containing polymer are together included in an amount of from 90% to 100% by weight of the polymer composition, wherein the polymer composition comprises less than 10% by weight, based on the total weight of starch and plasticizer, of a carbon-containing plasticizer with molar mass 500 g/mol or less;
   b. homogenizing the polymer composition with use of thermal and/or mechanical energy and adjusting the water content of the polymer composition to less than 5% by weight of the polymer composition;
   c. injection molding the homogenized polymer composition in a mold to form a molding that consists essentially of the polymer composition; and
   d. removing the molding from the mold.

* * * * *